(12) United States Patent
Hesketh

(10) Patent No.: US 9,033,136 B2
(45) Date of Patent: May 19, 2015

(54) TENSIONING ASSEMBLY FOR CABLE DRAG CONVEYOR WITH TENSIONING ASSEMBLY AND METHOD OF CONTROLLING TENSION IN A CABLE DRAG CONVEYOR

(71) Applicant: Spiroflow Systems, Inc., Monroe, NC (US)

(72) Inventor: David Francis Hesketh, Fort Mill, SC (US)

(73) Assignee: SPIROFLOW SYSTEMS, INC., Monroe, NC (US)

( * ) Notice: Subject to any disclaimer, the term of this patent is extended or adjusted under 35 U.S.C. 154(b) by 0 days.

(21) Appl. No.: 13/960,010

(22) Filed: Aug. 6, 2013

(65) Prior Publication Data

US 2015/0041285 A1     Feb. 12, 2015

(51) Int. Cl.
    *B65G 23/44*     (2006.01)
    *B65G 19/20*     (2006.01)
    *B65G 23/14*     (2006.01)

(52) U.S. Cl.
    CPC .............. *B65G 19/20* (2013.01); *B65G 23/14* (2013.01)

(58) Field of Classification Search
    CPC ........................................................ B65G 23/44
    USPC .................................... 198/813, 810.04, 814
    See application file for complete search history.

(56) References Cited

U.S. PATENT DOCUMENTS

| | | | |
|---|---|---|---|
| 5,895,332 A * | 4/1999 | Olson et al. | 198/813 |
| 6,598,736 B2 | 7/2003 | Ellis et al. | |
| 7,798,313 B2 | 9/2010 | Hesketh | |
| 7,980,384 B2 * | 7/2011 | Phalen | 198/813 |
| 2005/0045452 A1 * | 3/2005 | Iseli | 198/813 |

FOREIGN PATENT DOCUMENTS

| | | | | |
|---|---|---|---|---|
| JP | 60-15308 | * | 1/1985 | 198/813 |

OTHER PUBLICATIONS

Spiroflow Conveying & Bulk Bag Handling Solutions, Aero Mechanical Conveyors for dry bulk solids and ingredients, Sep. 2010 Edition, pp. 1-8, Spiroflow Limited, UK.
Spiroflow Conveying & Bulk Bag Handling Solutions, Tubular Drag Conveyors "Cableflow" cable or "Dynaflow" chain driven for dry bulk solids and ingredients across all industries, Sep. 2010 Edition, pp. 1-8, Spiroflow Limited, UK.

* cited by examiner

*Primary Examiner* — James R Bidwell
(74) *Attorney, Agent, or Firm* — Shumaker, Loop & Kendrick, LLP

(57) ABSTRACT

A tensioning assembly for a cable drag conveyor. The conveyor includes a head pulley mounted on a head pulley shaft positioned in a head pulley housing and a tail pulley mounted on a tail pulley shaft positioned in a tail pulley housing, infeed and discharge conveyor tubes interconnecting the head pulley housing and the tail pulley housing, and an endless rope having conveying disks attached to the rope positioned in the infeed and discharge conveyor tubes and around the head pulley and tail pulley. The tail pulley housing is positioned in a stationary position in relation to the head pulley and the head pulley housing. The tail pulley shaft and tail pulley is positioned on the tail pulley housing for movement in relation to the tail pulley housing, the head pulley and the head pulley housing. A tensioner moves the tail pulley to maintain the tail pulley at a distance in relation to the head pulley that results in correct tension on the rope during its travel through the cable drag conveyor.

15 Claims, 5 Drawing Sheets

TENSIONING ASSEMBLY FOR CABLE DRAG CONVEYOR WITH TENSIONING ASSEMBLY AND METHOD OF CONTROLLING TENSION IN A CABLE DRAG CONVEYOR

TECHNICAL FIELD AND BACKGROUND OF THE INVENTION

This application discloses a novel tension control apparatus and tensioning method for a cable drag conveyor. A cable drag conveyor is used to convey powders and other particulate matter by entraining the particulate matter between discs. Such conveyors typically include an endless wire rope assembly upon which the disks are fastened and used for carrying the particulate matter. The rope assembly is typically carried along a circuit defined by a straight and curved tube or pipe, with sections for product in feed and discharge, an enclosed head and tail pulleys, and idler corners in various configurations on the empty return side of the conveyor to complete the circuit. The housings are interconnected by two tubes through which the rope assembly travels as it moves around the head and tail pulleys. As the conveyor operates, forces are exerted on the rope assembly that can cause the rope assembly to stretch. These forces are created by normal wear on the conveyor, the weight of the material being conveyed along the rope assembly, and similar other factors. The rope assembly can stretch to the point that a conventional tensioning device cannot exert adequate tension on the rope.

Cable drag conveyors typically travel in the range of 150 ft./min (46 m/min) and are particularly useful in conveying relatively fragile material such as coffee and grains with damage. This type of conveyor is distinguished from aeromechanical conveyors, which travel at much higher speeds, for example, up to 1200 ft./min (367 m/min) and create an air stream in which the material is entrained.

Prior art manual tension adjusting mechanisms exist for moving the head and tail pulley assemblies relative to each other to maintain the correct amount of tension on the rope assembly. For example, some traditional prior art tension adjusting mechanisms rely on clamps which fasten the semicircular housings to the tubes. Tension on the rope assembly is adjusted by loosening the bolts that hold the clamps in place and sliding one or both of the housings inwardly or outwardly relative to the tubes. Another prior art method of adjusting the tension on the rope assembly involves moving the drive or driven pulley together with the housing. Regardless of which prior art method is employed, adjusting the tension by moving the housings relative to the conveyor tubes is a manual operation. In addition, the discharge end of the equipment is frequently inaccessible, making access to the tube joining clamps challenging, and according to each method, the clamps have to be slackened and re-tightened. Furthermore, once the tension has been adjusted, there is no guarantee that the tubes and the connecting spigots leading to the housings will be properly aligned, which makes jamming a possible cause of failure.

Other devices and methods for controlling tension in conveyors are disclosed in applicant's U.S. Pat. Nos. 7,798,313 and 6,598,736.

The invention of the present application overcomes the problems inherent to the prior art described above by providing a tension control apparatus for use on a cable drag conveyor that adjusts tension without moving the housings and without requiring any significant manual intervention. The tension control apparatus of the present invention preferably uses a constant load device such as a pneumatic cylinder that applies a pre-selected amount of tension on the rope assembly.

SUMMARY OF THE INVENTION

Therefore, it is an object of the present invention to provide a cable drag conveyor that does not require movement of the head and tail housing to control tension on the conveyor rope assembly.

It is another object of the present invention to provide a cable drag conveyor that includes a tension control apparatus that dynamically maintains the tensioning force applied to the rope assembly.

It is another object of the present invention to provide a cable drag conveyor having a simple device for applying a generally constant tension on the rope assembly.

It is another object of the present invention to provide a cable drag conveyor that includes a tension control apparatus which can be used in vertical, angled or horizontal conveyor systems.

These and other objects and advantages of the invention are achieved by providing a tensioning assembly for use in cable drag conveyor for conveying bulk materials. The conveyor includes a head pulley mounted on a head pulley shaft positioned in a head pulley housing and a tail pulley mounted on a tail pulley shaft positioned in a tail pulley housing, spaced apart infeed and discharge conveyor tubes interconnecting the head pulley housing and the tail pulley housing, and an endless rope having spaced-part conveying disks attached to the rope positioned in the infeed and discharge conveyor tubes and around the head pulley and tail pulley. The tensioning assembly includes the tail pulley housing being positioned in a stationary position in relation to the head pulley and the head pulley housing. The tail pulley shaft and tail pulley is positioned on the tail pulley housing for movement in relation to the tail pulley housing, the head pulley and the head pulley housing. A tensioner is provided for moving the tail pulley to maintain the tail pulley at a distance in relation to the head pulley that results in correct tension on the rope during its travel through the conveyor circuit.

According to another embodiment of the invention, the tensioner includes a tail pulley mounting block mounted on the stationary tail pulley and adapted for movement on the tail pulley housing, a pneumatic cylinder including a piston mounted on the tail pulley housing, and a cylinder rod attached to the piston of the pneumatic cylinder and engaging the tail pulley mounting block for moving the tail pulley mounting block responsive to pneumatic pressure on the piston.

According to yet another embodiment of the invention, the tail pulley mounting block is mounted on at least one guide rail carried by the stationary tail pulley housing.

According to yet another embodiment of the invention, the tail pulley mounting block is mounted on a pair of spaced-apart guide rails carried by the stationary tail pulley housing in alignment with a direction of travel of the infeed and discharge conveyor tubes.

According to yet another embodiment of the invention, the tail pulley housing includes a rectilinear frame positioned in alignment with the infeed and discharge conveyor tubes and defining a central opening. At least one guide rail is positioned on opposing front and rear ends of the frame in alignment with a direction of travel of the infeed and discharge conveyor tubes. A tail pulley mounting block is mounted on at least one guide rail and adapted for movement within the central opening of the frame. A pneumatic cylinder including a piston is mounted on the frame in alignment with the direction of travel of the infeed and discharge conveyor tubes. A cylinder rod is attached to the piston of the pneumatic cylinder and engages the tail pulley mounting block for moving the tail pulley mounting block in the central opening responsive to pneumatic pressure on the piston. An infeed tail pulley tube and a discharge tail pulley tube is mounted on the front end of the frame for respectively interconnecting with the infeed and discharge conveyor tubes.

According to yet another embodiment of the invention, a tensioning assembly for use in a cable drag conveyor for conveying bulk materials is disclosed. The conveyor includes a head pulley mounted on a head pulley shaft positioned in a head pulley housing and a tail pulley mounted on a tail pulley shaft positioned in a tail pulley housing. Spaced apart infeed and discharge conveyor tubes interconnect the head pulley housing and the tail pulley housing, and an endless rope having spaced-part conveying disks is attached to the rope positioned in the infeed and discharge conveyor tubes and around the head pulley and tail pulley. The tensioning assembly comprises the tail pulley housing positioned in a stationary position in relation to the head pulley and the head pulley housing and a tail pulley mounting block mounted on at least one guide rail carried by the stationary tail pulley housing and adapted for movement on the tail pulley housing. A pneumatic cylinder is provided and includes a piston mounted on the tail pulley housing. A cylinder rod is attached to the piston of the pneumatic cylinder and engages the tail pulley mounting block for moving the tail pulley mounting block responsive to pneumatic pressure on the piston. The tail pulley shaft and tail pulley are positioned on the tail pulley housing for movement in relation to the tail pulley housing, the head pulley and the head pulley housing. A tensioner cooperates with the tail pulley to maintain the tail pulley at a distance in relation to the head pulley that results in correct tension on the rope during its travel through the conveyor.

According to yet another embodiment of the invention, the stationary tail pulley housing includes an infeed tail pulley tube and a discharge tail pulley tube for respectively interconnecting with the infeed and discharge conveyor tubes.

In a method according to the invention for controlling the tension on a rope in cable drag conveyor for conveying bulk materials, the drag conveyor is of the type that includes a head pulley mounted on a head pulley shaft positioned in a head pulley housing and a tail pulley mounted on a tail pulley shaft positioned in a tail pulley housing, spaced apart infeed and discharge conveyor tubes interconnecting the head pulley housing and the tail pulley housing, and an endless rope having spaced-part conveying disks attached to the rope positioned in the infeed and discharge conveyor tubes and around the head pulley and tail pulley. The method includes the steps of maintaining the tail pulley housing in a stationary position in relation to the head pulley; mounting the tail pulley in the tail pulley housing for movement in relation to the head pulley, and moving the tail pulley to maintain the tail pulley at a distance in relation to the head pulley that results in correct tension on the rope during its travel through the conveyor.

According to yet another embodiment of the invention, the method includes the step of applying the tension to the tail pulley by a pneumatic cylinder assembly.

According to yet another embodiment of the invention, the method includes the step of moving the tail pulley relative to the tail pulley housing by sliding the tail pulley on at least one guide rail extending between front and back ends of the tail pulley housing.

According to yet another embodiment of the invention, a cable drag conveyor is provided for conveying bulk materials and includes a head pulley mounted on a head pulley shaft positioned in a head pulley housing. A tail pulley is mounted on a tail pulley shaft positioned in a tail pulley housing. Spaced apart infeed and discharge conveyor tubes interconnect the head pulley housing and the tail pulley housing, and an endless rope having spaced-part conveying disks attached to the rope is positioned in the infeed and discharge conveyor tubes and around the head pulley and tail pulley. A tensioning assembly is provided for maintaining proper tension on the endless rope and includes the tail pulley housing being positioned in a stationary position in relation to the head pulley and the head pulley housing. The tail pulley shaft and tail pulley is positioned on the tail pulley housing for movement in relation to the tail pulley housing, the head pulley and the head pulley housing. A tensioner is provided that cooperates with the tail pulley to maintain the tail pulley at a correct tension in relation to the head pulley.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
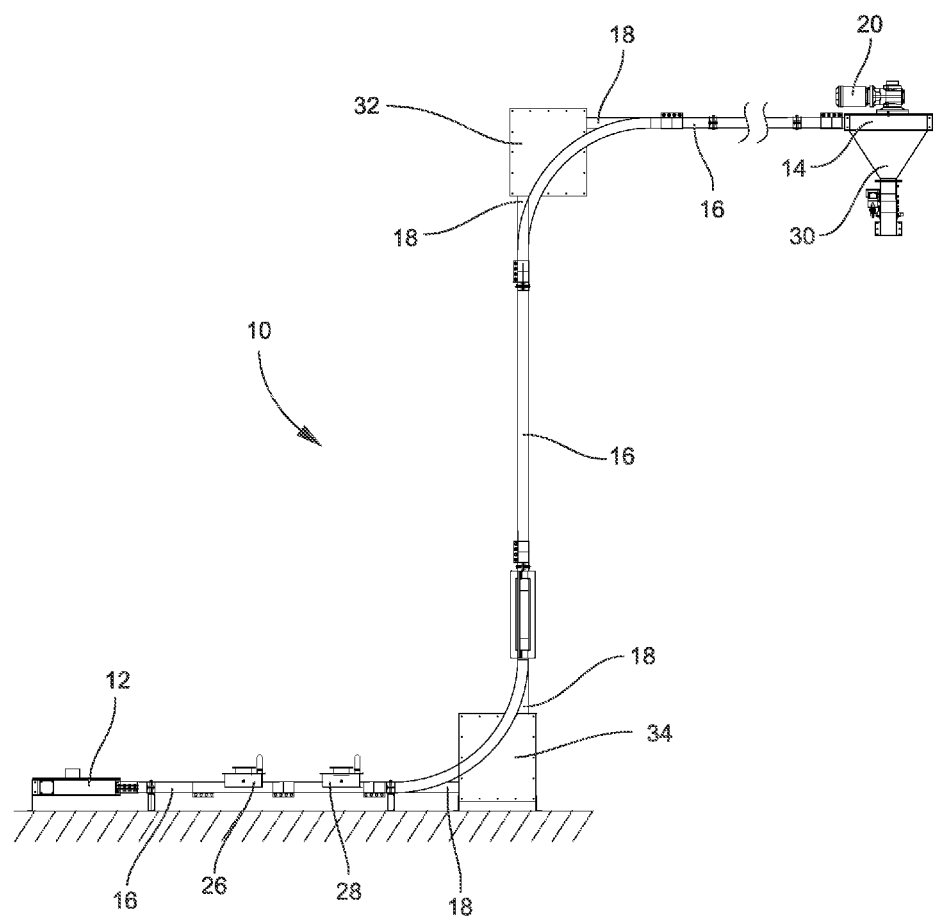
FIG. 1 is a side elevation of a cable drag conveyor of the type wherein bulk material is conveyed from a relatively low position to a higher position.
Figure 2:
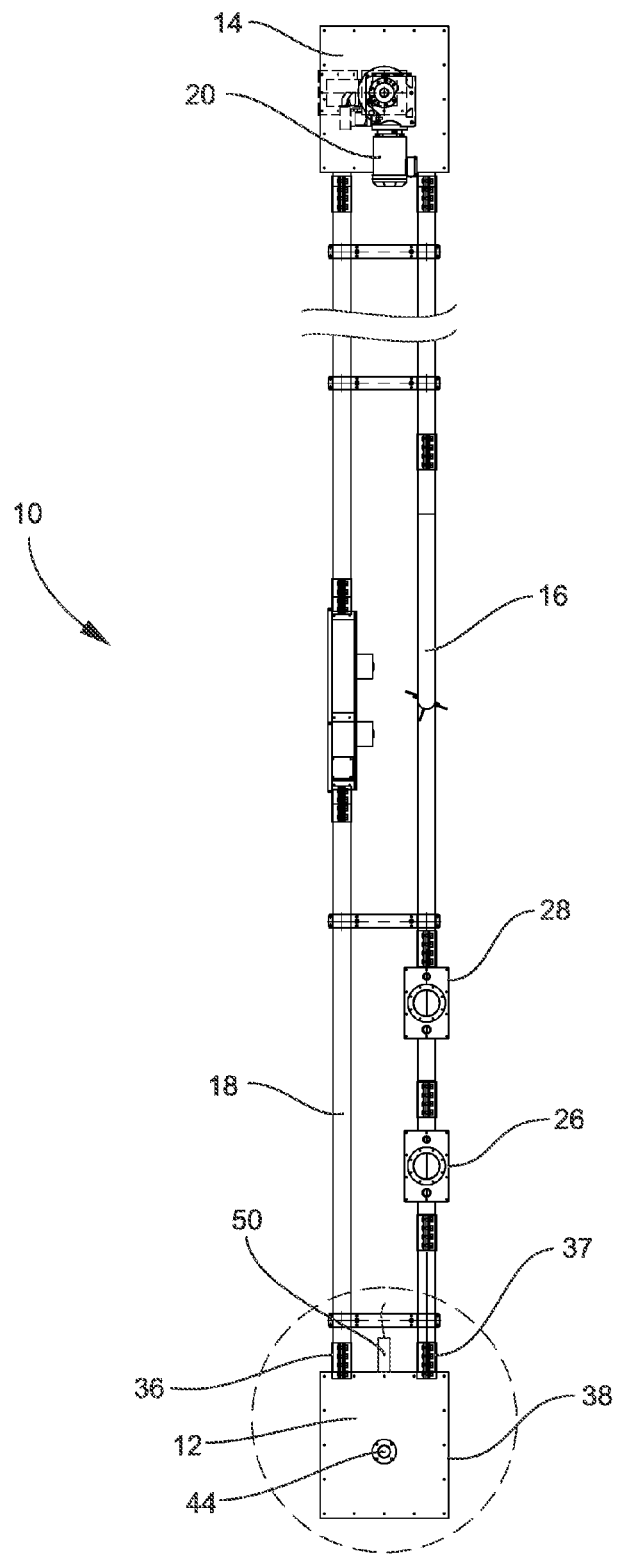
FIG. 2 is a top plan view of the cable drag conveyor of FIG. 1.
Figure 3:
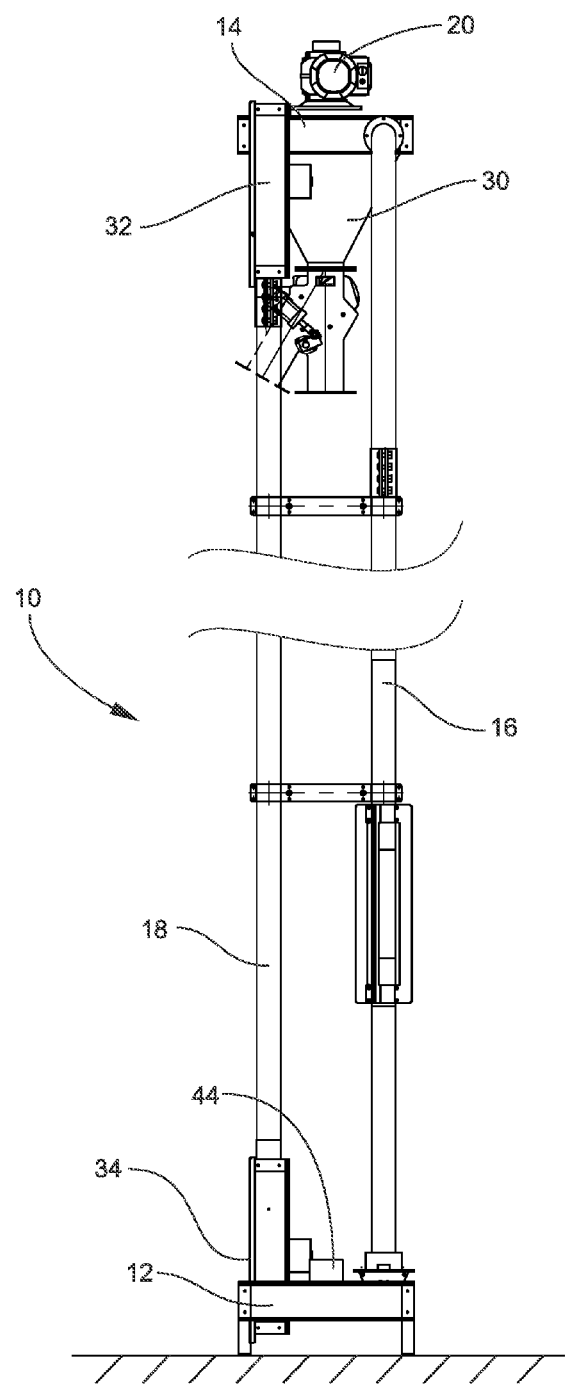
FIG. 3 is an end elevation of the cable drag conveyor of FIG. 1.

Referring now specifically to the drawings, a cable drag conveyor according to one preferred embodiment of the invention is shown in FIGS. 1-3 and indicated a reference numeral 10. Conveyor 10 includes a tail pulley housing 12, a head pulley housing 14 and product feed and empty rope return conveyor tubes 16 and 18, respectively. A drive motor 20 drives the head pulley housing 14 and provides movement to a conveyor rope 22 on which are carried a multitude of spaced-apart disks 24, best shown in FIGS. 4 and 5. The conveyor rope 20 travels in a loop between the tail pulley housing 12 and the head pulley housing 14. Product, for example, powder or granular material, is introduced into the infeed conveyor tube 16 at conveyor inlets 26, 28 and are conveyed to the conveyor outlet 30 through the infeed conveyor tube 16 to the head pulley housing 14 where the material is discharged into a conveyor outlet 30. The materials are then transferred to downstream stations for further processing. The rope 22 continues the loop, traveling along the return conveyor tube 18 and across idler sprockets, not shown, positioned in idler sprocket housings 32 and 34. From the idler sprocket housing 34 the rope 22 continues to the tail pulley housing 12.

Figure 4:
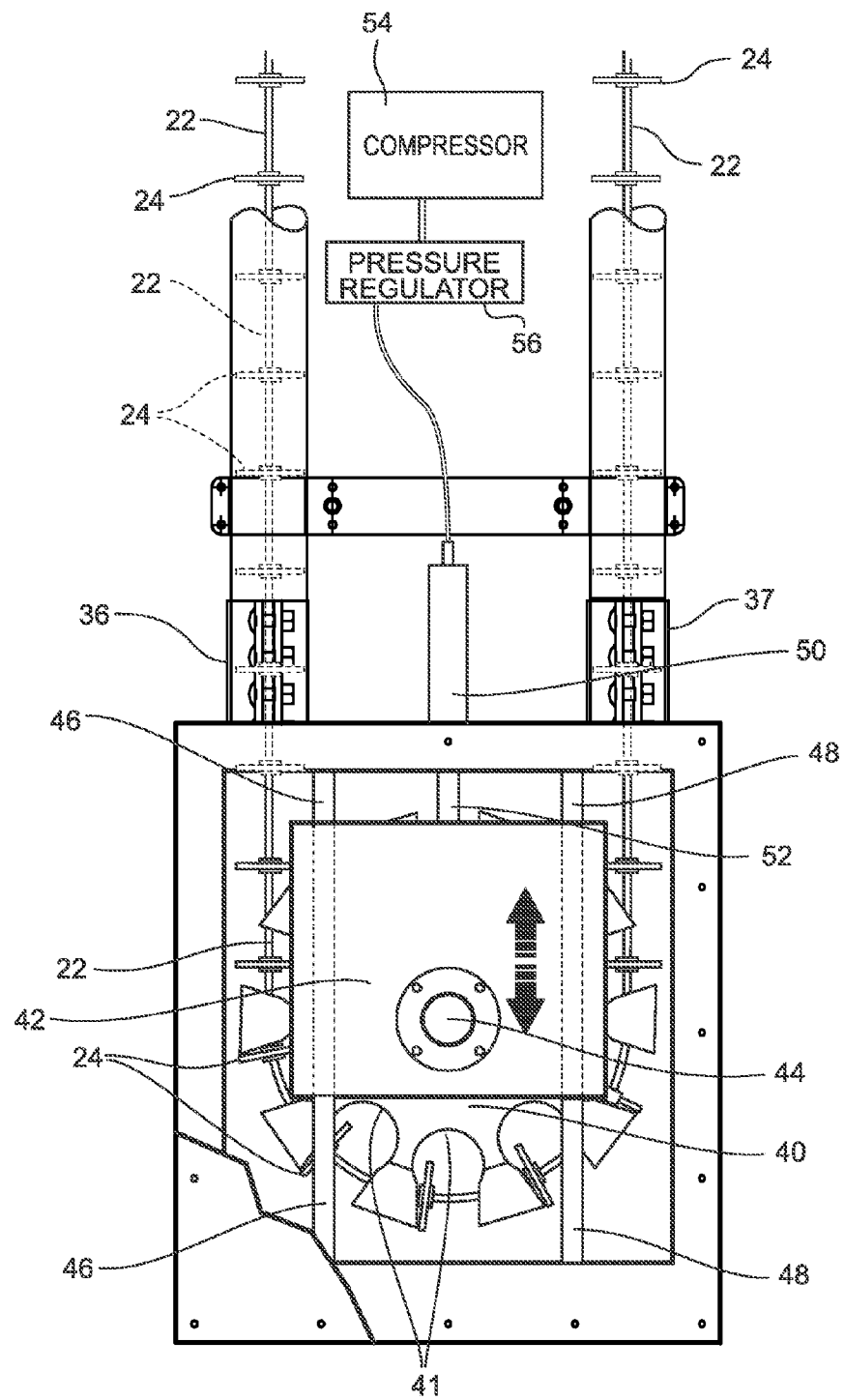
FIG. 4 is an enlarged top plan view of the tail pulley assembly and connecting components.
Figure 5:
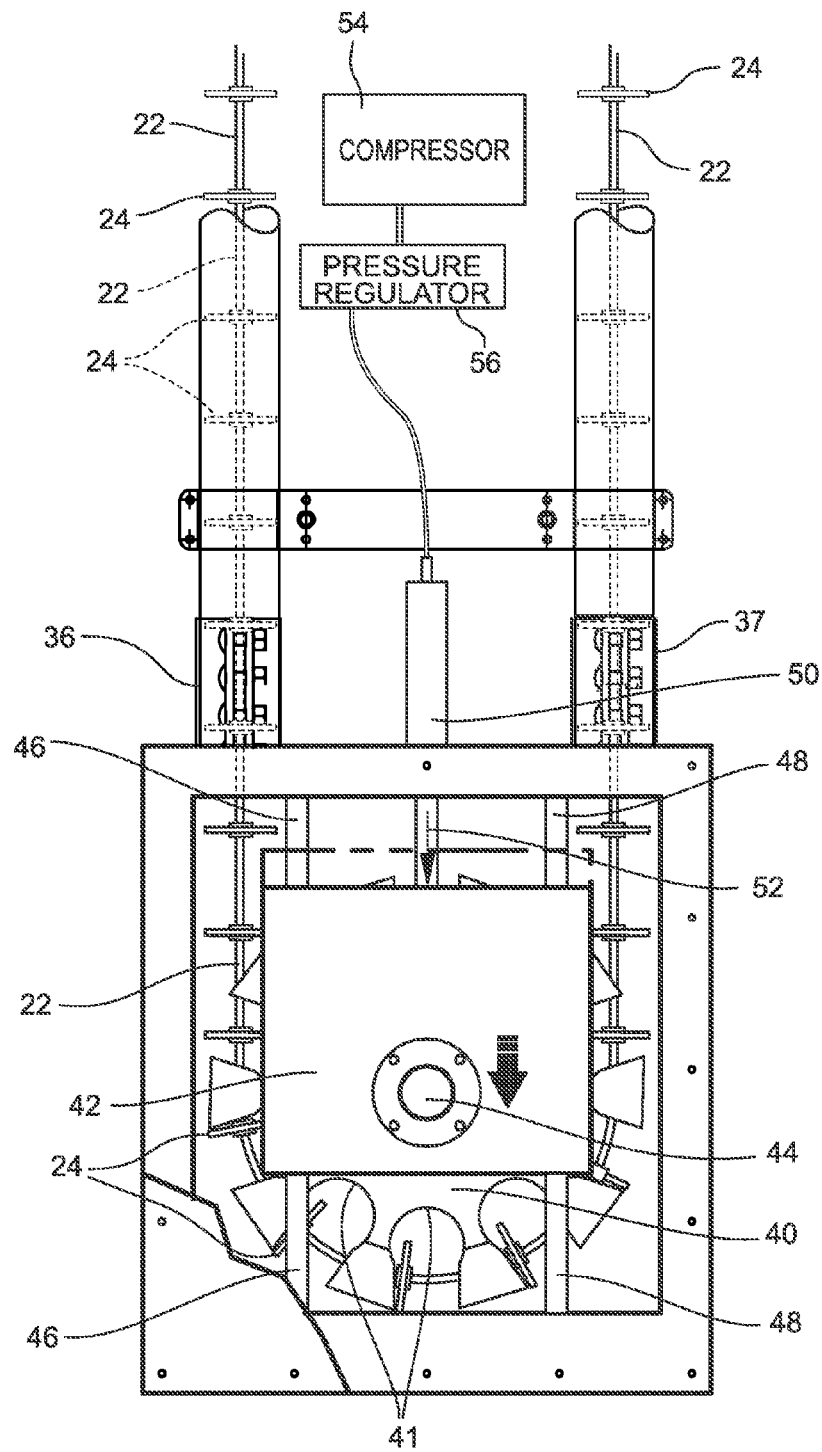
FIG. 5 is a view similar to FIG. 4, showing movement of the tail pulley mounting block to maintain proper tension on the rope assembly.

Referring now to FIGS. 4 and 5, the rope 22 passes into a discharge tail pulley tube 36 carried by a frame 38, which is stationarily mounted in a fixed position and at a fixed distance and orientation with relation to the head pulley 14. Tail pulley 40 is mounted on a tail pulley mounting block 42 by a tail pulley shaft 44. The tail pulley 40 is provided with circumferentially-extending recessed pockets 41 that are shaped and sized to catch the back surface of the disks 24 as they enter the tail pulley housing 12. The tail pulley 40 therefore guides the disks 24 and the attached rope 22 through the tail pulley housing 12, through an infeed tail pulley tube 37 and back towards the conveyor inlets 26 and 28 to receive the material being conveyed.

The tail pulley mounting block 42 is mounted for sliding movement on a pair of guide rails 46, 48 extending between the front and rear ends of the frame 38 in alignment with the direction of travel of the rope 22. The sliding movement of the tail pulley mounting block 42 is controlled by, for example, a pneumatic cylinder 50 attached to the frame 38, as shown in FIGS. 4 and 5. A piston rod 52 actuated by the cylinder 50 engages the tail pulley mounting plate 42. Pressure exerted by the cylinder 50 urges the tail pulley mounting plate 42 rearwardly to place tension on the rope 22 to compensate for any variation in the length of the rope 22 during operation. Air is supplied to the cylinder 50 by a compressor 54 that feeds air to a pressure regulator 56. In the preferred embodiment disclosed in this application, it has been determined that in most instances expensive load cells, feedback loops and the like are unnecessary. It is sufficient to adjust the tension for a particular material being conveyed empirically, and set the system to maintain a predetermined pressure on the tail mounting plate 42. In practice, variations in tension are typically within narrow limits and the tail mounting pate 42 will oscillate slightly to maintain the correct tension.

However, alternative means of controlling tension may be used, such as those disclosed and explained in, for example, applicant's U.S. Pat. No. 7,798,313, col. 6, line 34, col. 8, line 39. These alternatives are included within the scope of the invention of this application.

Even though a pneumatic cylinder 50 is disclosed as the operative mechanism to provide tension on the rope 22, other devices, such as a hydraulic cylinder, spring, electro-mechanical actuator or friction brake can be used.

A tension control apparatus and tensioning method for an cable drag conveyor according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A tensioning assembly for use in a cable drag conveyor for conveying bulk materials, the conveyor including a head pulley mounted on a head pulley shaft positioned in a head pulley housing and a tail pulley mounted on a tail pulley shaft positioned in a tail pulley housing, spaced apart infeed and discharge conveyor tubes interconnecting the head pulley housing and the tail pulley housing, and an endless rope having spaced-part conveying disks attached to the rope positioned in the infeed and discharge conveyor tubes and around the head pulley and tail pulley, the tensioning assembly comprising:
   (a) the tail pulley housing being positioned in a stationary position in relation to the head pulley and the head pulley housing;
   (b) the tail pulley shaft and tail pulley being positioned on the tail pulley housing for movement in relation to the tail pulley housing, the head pulley and the head pulley housing; and
   (c) a tensioner positioned between and in the same vertical plane as the infeed and discharge conveyor tubes, the tensioner configured to exert symmetrical force against the tail pulley to maintain the tail pulley at a distance in relation to the head pulley that results in correct tension on the rope during its travel through the cable drag conveyor while minimizing eccentric forces on the tail pulley and tail pulley shaft.

2. A tensioning assembly according to claim 1, wherein the tensioner comprises:
   (a) a tail pulley mounting block mounted on the stationary tail pulley and adapted for movement on the tail pulley housing;
   (b) a pneumatic cylinder including a piston mounted on the tail pulley housing; and
   (c) a cylinder rod attached to the piston of the pneumatic cylinder and engaging the tail pulley mounting block for moving the tail pulley mounting block responsive to pneumatic pressure on the piston.

3. A tensioning assembly according to claim 1, wherein the tail pulley mounting block is mounted on at least one guide rail positioned within the stationary tail pulley housing.

4. A tensioning assembly according to claim 1, wherein the tail pulley mounting block is mounted on a pair of spaced-apart guide rails carried by the stationary tail pulley housing in alignment with a direction of travel of the infeed and discharge conveyor tubes, wherein each guide rail is axially offset relative to the infeed and discharge conveyor tubes.

5. A tensioning assembly according to claim 1, wherein the tail pulley housing comprises:
   (a) a rectilinear frame positioned in alignment with the infeed and discharge conveyor tubes and defining a central opening;
   (b) at least one guide rail positioned on opposing front and rear ends of the frame in alignment with a direction of travel of a direction of travel of the infeed and discharge conveyor tubes;
   (c) a tail pulley mounting block mounted on the at least one guide rail and adapted for movement within the central opening of the frame;
   (d) a pneumatic cylinder including a piston mounted on the frame in alignment with the direction of travel of the infeed and discharge conveyor tubes;
   (e) a cylinder rod attached to the piston of the pneumatic cylinder and engaging the tail pulley mounting block for moving the tail pulley mounting block in the central opening responsive to pneumatic pressure on the piston, the pneumatic cylinder and piston positioned between and in the same vertical plane as the infeed and discharge conveyor tubes, and
   (f) an infeed tail pulley tube and a discharge tail pulley tube mounted on the front end of the frame for respectively interconnecting with the infeed and discharge conveyor tubes.

6. A tensioning assembly for use in a cable drag conveyor for conveying bulk materials, the conveyor including a head pulley mounted on a head pulley shaft positioned in a head pulley housing and a tail pulley mounted on a tail pulley shaft positioned in a tail pulley housing, spaced apart infeed and discharge conveyor tubes interconnecting the head pulley housing and the tail pulley housing, and an endless rope having spaced-part conveying disks attached to the rope positioned in the infeed and discharge conveyor tubes and around the head pulley and tail pulley, the tensioning assembly comprising:
   (a) the tail pulley housing positioned in a stationary position in relation to the head pulley and the head pulley housing;

(b) a tail pulley mounting block mounted on at least one guide rail carried by the stationary tail pulley housing and adapted for movement on the tail pulley housing;

(c) a pneumatic cylinder including a piston mounted on the tail pulley housing;

(d) a cylinder rod attached to the piston of the pneumatic cylinder and engaging the tail pulley mounting block for moving the tail pulley mounting block responsive to pneumatic pressure on the piston;

(e) the tail pulley shaft and tail pulley positioned on the tail pulley housing for movement in relation to the tail pulley housing, the head pulley and the head pulley housing; and (f) a tensioner cooperating with the tail pulley to maintain the tail pulley at a distance in relation to the head pulley that results in correct tension on the rope during its travel through the cable drag conveyor, wherein:

the pneumatic cylinder and piston are positioned between and in a vertical plane that is the same as a vertical plane of the infeed and discharge conveyor tubes, and are configured to exert symmetrical force against the tail pulley to minimize eccentric forces on the tail pulley and tail pulley shaft.

7. A tensioning assembly according to claim 6, wherein the stationary tail pulley housing includes an infeed tail pulley tube and a discharge tail pulley tube for respectively interconnecting with the infeed and discharge conveyor tubes.

8. A method for controlling the tension on a rope in a cable drag conveyor for conveying bulk materials of the type wherein the conveyor includes a head pulley mounted on a head pulley shaft positioned in a head pulley housing and a tail pulley mounted on a tail pulley shaft positioned in a tail pulley housing, spaced apart infeed and discharge conveyor tubes interconnecting the head pulley housing and the tail pulley housing, and an endless rope having spaced-part conveying disks attached to the rope positioned in the infeed and discharge conveyor tubes and around the head pulley and tail pulley, the method including the steps of:

(a) maintaining the tail pulley housing in a stationary position in relation to the head pulley;

(b) mounting the tail pulley in the tail pulley housing for movement in relation to the head pulley; and (c) moving the tail pulley by means of a tensioner positioned between and in the same vertical plane as the infeed and discharge conveyor tubes, exerting symmetrical force against the tail pulley to maintain the tail pulley at a distance in relation to the head pulley that results in correct tension on the rope during its travel through the cable drag conveyor while minimizing eccentric force on the tail pulley and tail pulley shaft.

9. A method according to claim 8, and including the step of applying the tension to the tail pulley by a pneumatic cylinder assembly, the pneumatic cylinder assembly including a pneumatic cylinder and piston positioned between and in the same vertical plane as the infeed and discharge conveyor tubes.

10. A method according to claim 8, and including the step of moving the tail pulley relative to the tail pulley housing by sliding the tail pulley on at least one guide rail extending between and front and back ends of the tail pulley housing and positioned within the tail pulley housing.

11. A cable drag conveyor for conveying bulk materials, comprising:

(a) a head pulley mounted on a head pulley shaft positioned in a head pulley housing;

(b) a tail pulley mounted on a tail pulley shaft positioned in a tail pulley housing;

(c) spaced apart infeed and discharge conveyor tubes interconnecting the head pulley housing and the tail pulley housing, and an endless rope having spaced-part conveying disks attached to the rope positioned in the infeed and discharge conveyor tubes and around the head pulley and tail pulley;

(d) a tensioning assembly for maintaining proper tension on the endless rope, and comprising:
  (i) the tail pulley housing being positioned in a stationary position in relation to the head pulley and the head pulley housing;
  (ii) the tail pulley shaft and tail pulley being positioned on the tail pulley housing for movement in relation to the tail pulley housing, the head pulley and the head pulley housing; and
  (iii) a tensioner cooperating with the tail pulley to maintain the tail pulley at a correct tension in relation to the head pulley, wherein:

the tensioner is positioned between and in the same vertical plane as the infeed and discharge conveyor tubes, the tensioner configured to exert symmetrical force against the tail pulley to maintain the tail pulley at a distance in relation to the head pulley that results in correct tension on the rope during its travel through the cable drag conveyor while minimizing eccentric forces on the tail pulley, and tail pulley shaft.

12. A cable drag conveyor according to claim 11, wherein the tensioner comprises:

(a) a tail pulley mounting block mounted on the stationary tail pulley and adapted for movement on the tail pulley housing;

(b) a pneumatic cylinder including a piston mounted on the tail pulley housing;

(c) a cylinder rod attached to the piston of the pneumatic cylinder and engaging the tail pulley mounting block for moving the tail pulley mounting block responsive to pneumatic pressure on the piston, wherein:

the pneumatic cylinder and piston are positioned between and in the same vertical plane as the infeed and discharge conveyor tubes, and the pneumatic cylinder and piston are configured to exert symmetrical force against the tail pulley to minimize eccentric forces on the tail pulley and tail pulley shaft.

13. A cable drag conveyor according to claim 11, wherein the tail pulley mounting block is mounted on at least one guide rail positioned within the stationary tail pulley housing.

14. A cable drag conveyor according to claim 11, wherein the tail pulley mounting block is mounted on a pair of spaced-apart guide rails carried by the stationary tail pulley housing in alignment with a direction of travel of the infeed and discharge conveyor tubes, wherein each guide rail is axially offset relative to the infeed and discharge conveyor tubes.

15. A cable drag conveyor according to claim 11, wherein the tail pulley housing comprises:

(a) a rectilinear frame positioned in alignment with the infeed and discharge conveyor tubes and defining a central opening:

(b) at least one guide rail positioned on opposing front and rear ends of the frame in alignment with a direction of travel of a direction of travel of the infeed and discharge conveyor tubes;

(c) a tail pulley mounting block mounted on the at least one guide rail and adapted for movement within the central opening of the frame;

(d) a pneumatic cylinder including a piston mounted on the frame in alignment with the direction of travel of the infeed and discharge conveyor tubes, the pneumatic cylinder and piston positioned between and in the same vertical plane as the infeed and discharge conveyor tubes;

(e) a cylinder rod attached to the piston of the pneumatic cylinder and engaging the tail pulley mounting block for moving the tail pulley mounting block in the central opening responsive to pneumatic pressure on the piston; and (f) an infeed tail pulley tube and a discharge tail pulley tube mounted on the front end of the frame for respectively interconnecting with the infeed and discharge conveyor tubes.

* * * * *